United States Patent [19]
Walsh et al.

[11] Patent Number: 5,743,079
[45] Date of Patent: Apr. 28, 1998

[54] TURBINE ENGINE CONTROL SYSTEM

[75] Inventors: Philip P. Walsh, Birmingham; Nicholas C. Corbett, Solihull; Arthur L. Rowe, Derby, all of England

[73] Assignee: Rolls-Royce plc, London, England

[21] Appl. No.: 715,734

[22] Filed: Sep. 19, 1996

[30] Foreign Application Priority Data

Sep. 30, 1995 [GB] United Kingdom ............. 9520002

[51] Int. Cl.⁶ ........................................... F02C 9/28
[52] U.S. Cl. ............................. 60/39.03; 60/39.281
[58] Field of Search .................. 60/39.03, 39.24, 60/39.27, 39.281

[56] References Cited

U.S. PATENT DOCUMENTS

| | | |
|---|---|---|
| 5,115,635 | 5/1992 | Jennings et al. |
| 5,319,931 | 6/1994 | Beebe et al. .................. 60/39.03 |
| 5,327,718 | 7/1994 | Iwata et al. .................. 60/39.03 |
| 5,373,692 | 12/1994 | Correa . |
| 5,469,700 | 11/1995 | Corbett et al. ............... 60/39.281 |
| 5,596,871 | 1/1997 | Lenertz ....................... 60/39.03 |

FOREIGN PATENT DOCUMENTS

92/077221  4/1992  WIPO .

*Primary Examiner*—Louis J. Casaregola
*Attorney, Agent, or Firm*—Cushman Darby & Cushman Intellectual Property Group of Pillsbury Madison & Sutro LLP

[57] ABSTRACT

A fuel control system for a premixed lean burn combustor in a combustion turbine engine, the combustor having at least two stages (P,S,T), the control system including; an air flow evaluation module having means utilising an iterative algorithm to derive an accurate value of total air flow to the combustor, the evaluation module further having means dividing the derived total air flow value into the proportions (Mp, Ms, Mt) required by the combustor stages (p,s, t) and outputting signals in parallel representing the air flow to respective combustor stages (p,s,t), and a control module associated with each stage (p,s,t) of the combustor and responsible for setting the fuel demand signal for the associated combustor stage (p,s,t), each control module being adapted to set the fuel demand signal with reference to an appropriate one of said output signals.

24 Claims, 3 Drawing Sheets

TURBINE ENGINE CONTROL SYSTEM

This invention relates to a fuel control system for a gas turbine engine, particularly an engine whose combustion system has been designed with a view to reducing emission levels of pollutants in its exhaust gases.

There is currently worldwide awareness of the need to limit the pollutants emitted from fossil fuelled engines. This concern is being expressed in terms of increasingly strict legislation in the leading industrial countries.

Pollutants emitted from gas turbine engines are directly related to the temperature at which the air and fuel reactants are burnt in their combustion systems. The principle pollutants are emissions of nitrous oxides (NOx), which begin forming at high temperatures and increase exponentially with increasing temperature, carbon monoxide (CO), and unburned hydrocarbons (UHC). Both the latter two pollutants are produced due to incomplete or weak combustion, typically at low combustion temperatures.

It has therefore been necessary to design and develop combustors using combustion techniques which enable combustion temperatures to be kept within certain limits known to substantially avoid pollutant production. Two available techniques are "rich burn rapid quench" and "premix lean burn" and both accomplish the objective by avoiding the high temperatures generated at near-stoichiometric conditions. The terms "rich" and "lean" convey the magnitude of the air/fuel mixture strength with respect to stoichiometric combustion conditions.

A combustor utilising the "premix lean burn" technique is described in International patent application number PCT/GB91/01658, having the International publication number WO92/07221, which is hereby incorporated by reference. In this design, combustion occurs in one, two or three successive stages according to the ambient temperature and the power levels being produced. At each stage, controlled amounts of fuel and air are injected, mixed together and burnt in particular ways as disclosed in the patent application. This strategy enables much reduced emissions of NOx, CO and UHC compared to conventional combustors.

A fuel control system for this combustor is described in International patent application number PCT/GB92/01982, having the International publication number WO93/09339, which is also hereby incorporated by reference. This design utilises a method of scheduling fuel flow to a plurality of combustion stages, comprising putting a plurality of engine fuel flow governors in parallel with each other and letting the governor which outputs the lowest fuel demand signal be the one which schedules the total fuel flow to the engine, fuel flows to the plurality of combustion stages then being individually scheduled to achieve the lowest fuel flows consistent with predefined temperature limits for the corresponding stages of combustion.

One of the problems inherent in employing "lean" fuel/air mixtures is that they necessitate operating the combustion system in close proximity to the reactants' weak extinction limit. Therefore, to provide low emissions over a wide operating range demands that the air/fuel ratio is modulated in some way to sustain combustion, particularly at part-load conditions, where the mixture would otherwise be too weak to burn. The use of staged combustion provides a means of subdividing the expansion of the combustion reactants into a number of smaller, easier to manage, processes. Thus, air/fuel ratios in each stage can be individually set, thereby effectively achieving the desirable modulation of the air/fuel ratio for the overall process without recourse to potentially unreliable variable geometry hardware features for changing airflows through the combustor. Of course, to meet the pollutant emission targets, the combustion temperature within each of these stages must be controlled within the correct narrow temperature bands, as disclosed in the above referenced patent applications.

Accurate control of the air/fuel ratio in each stage of this type of combustor is very important and necessitates accurate digital electronic control of fuel flow to each stage. This in turn necessitates accurate evaluation of combustor entry air mass flow rate. Although proportioning of the air flow to the respective stages of the combustor is determined by the combustor geometry, there is no easy way of directly measuring the total air flow to individual combustors. Of course, total air flow into the compressor can easily be measured, but variable amounts of this total air bypass the combustion process, being used for cooling, sealing and compressor bleed. Furthermore, any evaluation of flow rate must be done within the interrupt time frame of the digital controller.

It is an object of the present invention to provide an improved form of fuel control system for regulating fuel flow to a plurality of combustion stages in combustors employing premix lean burn staged combustion techniques.

It is a further object of the invention to improve regulation of fuel flow to such a staged combustor.

The present invention facilitates achievement of the above objects by providing the control system with a control module capable of evaluating combustor entry air mass flow rate in a novel way. In particular, an iterative algorithm is used in which guessed and calculated values converge in a small number of iterations, thereby efficiently using the available processor interrupt times for computation. It is also more accurate than known methods, giving better fuel flow control with less likelihood of flameout during engine transients. Furthermore, it needs a minimum of feedback signals, thus minimising instrumentation.

According to the present invention, there is provided a method for regulating fuel flow in a gas turbine engine comprising a compressor section, a combustor section, a turbine section, turbine nozzle guide vanes, fuel inputs and means to measure values for one or more of the parameters: engine entry pressure, compressor delivery pressure, combustor entry temperature, compressor exit capacity, nozzle guide vane NGV throat temperature, NGV throat capacity, fuel flow rate, specific humidity of the air, characterised in that the method includes the evaluation of combustor entry air mass flow rate (W31), the method for said evaluation comprising the steps of:

a) estimating a value for the NGV throat air mass flow rate (W405E);

b) evaluating NGV throat temperature (T405CALC);

c) evaluating NGV throat pressure (P405);

d) evaluating NGV throat capacity (WRTP405);

e) using the values of NGV throat temperature, pressure and capacity (T405CALC, P405, WRTP405) to calculate NGV throat mass flow rate (M);

(f) taking a value for fuel flow rate (WFE) and deducting it from the NGV throat mass flow rate (M) to give a value for air mass flow rate (W405CALC);

g) comparing the calculated value of the air mass flow rate (W405CALC) with the estimated value (W405E) and checking whether the two values agree within a specified tolerance;

h) if the two values (W405CALC, W405E) do not agree within the specified tolerance making a revised estimate (W405NEW) and carrying out steps b) to g) again until the two values (W405CALC, W405E) agree within the specified tolerance;

i) when the two values (W405CALC, W405E) agree within the specified tolerance outputting the calculated value (W405CALC) to give an output for the combustor entry air mass flow rate (W31) where W405CALC= W31 plus any air flow diverted from the combustor entry air flow.

Preferably an estimate of the value of NGV throat air mass flow rate (W405E) is made by ratioing the compressor exit capacity (WRTP30) with the combustor entry temperature (T30) and multiplying the result by the compressor delivery pressure (P30).

Preferably the specific humidity of the air (SH) and the estimated value (W405E) are input to a combustion temperature rise schedule (A) of the equivalence ratio φ (phi) of the fuel against NGV throat temperature rise (T405) dependent upon the input value of the specific humidity (SH) of the air in the two dimensional plane and with an input of combustor entry temperature (T30) in the three dimensional plane giving an output of T405CALC=T30+T405 for the input specific humidity (SH).

Preferably schedule A includes further inputs which comprise one or more of the stoichiometric air-fuel ratio (STOI), the calorific value of the fuel (LHV) and fuel flow rate (WFE).

Preferably a combustor pressure loss factor (P405/P30) is calculated using a schedule (B) of combustor pressure loss factor (P405/P30) against the pressure ratio of the compressor (P30/P20) adjusted for specific humidity (SH).

Preferably the output of schedule B (P405/P30) is multiplied by the compressor delivery pressure (P30) to give the NGV throat pressure (P405).

Preferably the NGV throat capacity (WRTP405) adjusted for specific humidity (SH) is derived from a schedule (C) of NGV throat capacity (WRTP405) against specific humidity (SH).

Preferably the square root of the NGV throat temperature is divided by the NGV throat pressure and multiplied by the NGV throat capacity $$\left( \frac{\sqrt{T405CALC}}{P405} \times WRTP405 \right)$$

to give the NGV throat mass flow rate (M).

Preferably the value for air mass flow rate (W405CALC) is compared with the estimated value (W405E) according to the convergence criterion (D) where D is:

ABS(W405CALC−W405E)/W405CALC<x where x is a specified value.

Preferably x=0.001.

Preferably the revised value of W405E is calculated from function E where E is:

W405NEW=W405E*(W405CALC/W405E)$^{1.15}$.

Preferably the NGV cooling air (CA) is diverted before the air flow passes into the combustor and the value of the cooling air flow (CA) is deducted from the calculated NGV throat air mass flow rate (W405CALC) to give an output of the combustor entry air mass flow rate (W31).

The invention further provides a fuel control system for a gas turbine engine comprising a compressor section, a combustor section, a turbine section, turbine nozzle guide vanes, fuel inputs and means to measure values for one or more of the parameters: engine entry pressure (P20) compressor delivery pressure (P30), combustor entry temperature (T30), compressor exit capacity (WRTP30), nozzle guide vane (NGV) throat temperature (T405), NGV throat capacity (WRTP405), fuel flow rate (WFE), specific humidity of the air (SH), characterised in that the fuel control system includes means to evaluate the combustor entry air mass flow rate (W31), the means for said evaluation comprising:

a) means to estimate a value for the NGV throat air mass flow rate (W405E);

b) means to evaluate NGV throat temperature (T405CALC);

c) means to evaluate NGV throat pressure (P405);

d) means to evaluate NGV throat capacity (WRTP405);

e) means using the values of NGV throat temperature, pressure and capacity (T405CALC, P405, WRTP405) to calculate NGV throat mass flow rate (M);

(f) means to take a value for fuel flow rate (WFE) and deduct it from the NGV throat mass flow rate (M) to give a value for air mass flow rate (W405CALC);

g) means to compare the calculated value of the air mass flow rate (W405CALC) with the estimated value (W405E) and to check whether the two values agree within a specified tolerance;

h) means to make a revised estimate (W405NEW) if the two values (W405CALC, W405E) do not agree within the specified tolerance;

i) means to give an output for the combustor entry air mass flow rate (W31) where W405CALC=W31 plus any air flow diverted from the combustor entry air flow when the two values (W405CALC, W405E) agree within the specified tolerance outputting the calculated value (W405CALC).

Preferably the means to estimate the value of NGV throat air mass flow rate (W405E) has means to make a ratio between the compressor exit capacity (WRTP30) and the combustor entry temperature (T30) and means to multiply the result by the compressor delivery pressure (P30).

Preferably the specific humidity of the air (SH) and the estimated value (W405E) are input to a combustion temperature rise schedule (A) of the equivalence ratio φ (phi) of the fuel against NGV throat temperature rise (T405) dependent upon the input value of the specific humidity (SH) of the air in the two dimensional plane and with an input of combustor entry temperature (T30) in the three dimensional plane giving an output of T405CALC=T30+T405 for the input specific humidity (SH).

Preferably schedule A includes further inputs which comprise one or more of the stoichiometric air-fuel ratio (STOI), the calorific value of the fuel (LHV) and fuel flow rate (WFE).

Preferably there are means to calculate a combustor pressure loss factor (P405/P30) using a schedule (B) of combustor pressure loss factor (P405/P30) against the pressure ratio of the compressor (P30/P20) adjusted for specific humidity (SH).

Preferably there are means to multiply the output of schedule B (P405/P30) by the compressor delivery pressure (P30) to give the NGV throat pressure (P405).

Preferably there are means to adjust the NGV throat capacity (WRTP405) for specific humidity (SH) derived from a schedule (C) of NGV throat capacity (WRTP405) against specific humidity (SH).

Preferably there are means to divide the square root of the NGV throat temperature by the NGV throat pressure and means to multiply by the NGV throat capacity (($\sqrt{T405CALC}$/P405)×WRTP405) to give the NGV throat mass flow rate (M).

Preferably there are means to compare the value for air mass flow rate (W405CALC) with the estimated value (W405E) according to the convergence criterion (D) where D is:

$$ABS(W405CALC-W405E)/W405CALC < x$$

where x is a specified value.

Preferably the revised value of W405E is calculated from function E where E is:

$$W405NEW=W405E*(W405CALC/W405E)^{1.15}.$$

Preferably the NGV cooling air (CA) is diverted before the air flow passes into the combustor (16) and there are means to deduct the value of the cooling air flow (CA) from the calculated NGV throat air mass flow rate (W405CALC) to give an output of the combustor entry air mass flow rate (W31).

Although applicable to any type of gas turbine combustion process (e.g., rich burn rapid quench, premixed lean burn parallel staged, or ordinary diffusion flame), in which temperature and/or emissions require close control or monitoring, the invention is most conveniently described in the context of the combustor and control system technology detailed in International patent application number PCT/GB92/01982, mentioned above.

Overview of Series Staged Combustion and Control

The series staged combustor design referred to in International patent application number PCT/GB92/01982, consists essentially of a number of separate combustion zones arranged in cascade, each independently fuelled, where the fuelling and the required number of active stages depends upon the ambient temperature and upon the power required from the power turbine: Cascading the combustion products between successive stages reduces the magnitude of the temperature rise required in the secondary and tertiary stages and significantly improves their weak extinction margins. This extends the power range over which the premix lean burn combustion process can be used.

However, the primary stage does not receive any preheat, and as the air at entry to the primary stage is at a relatively low temperature (650°–750° K.), its operating power range is small. This characteristic is compensated for by ensuring that whenever the combustor is operating in low emissions mode, i.e. premix lean burn, the secondary stage is always active along with the primary stage, thereby achieving low emissions over a wider power range. In addition, the primary stage is designed to operate at a substantially constant combustion temperature, so that its stability margin is not dependant on operating conditions.

To extend the power range further necessitates an increased number of premix lean burn stages, but as the air supply to the combustor is limited, an optimum number of stages is determined, e.g. two or three.

At engine starting and low power operation, a lean burn combustion mode is not practicable, and at such conditions, a diffusion flame combustion mode is utilised in the primary combustion region, instead of the premix lean burn combustion.

The above lean burn staged combustion strategy is based upon selecting the number of active stages and controlling the combustion process within the designed temperature limits. To avoid the need to measure combustion temperatures directly, which would entail closed loop feedback, the control system utilises an open loop technique in which the combustion temperature is determined from the thermodynamic properties of the air and fuel reactants. Therefore, measurement of characteristics such as ambient air temperature and humidity, air temperature before entry to the combustor, and air and fuel mass flow rates, allows the control system to compute and modulate the separate fuel flows to perform the required control of combustion temperature in each stage.

As is well known in the industry, air and fuel equivalence ratio relationships can be used to determine the combustion temperature rise for various air/fuel ratios. Only prior knowledge of the stoichiometric air/fuel ratio for the particular fuel being burnt is required.

In the control system described in patent application no. PCT/GB92/01982, the limiting temperatures of combustion for the two combustion modes and the two or three combustion stages are preset datums. The temperature of the air for combustion can be measured before it enters the combustor, hence the limiting equivalence ratio $\phi$ (Phi) can be determined directly from the curve of temperature rise versus equivalence ratio.

As $$\phi = \text{stoichiometric air/fuel ratio} \div \text{actual air/fuel ratio}$$

and the stoichiometric ratio is a constant for a given fuel composition, the limiting air/fuel ratio of interest for the particular stage or mode of combustion can be determined. Consequently, with knowledge of the air flow into the combustion stage, the maximum fuel flow permitted without exceeding the limiting temperature of combustion can be determined.

A parameter which must be taken into account is the moisture content of the air passed to the combustor, because increasing water content reduces combustion temperature for a given air/fuel ratio. This increases emissions of both CO and NOx and moves the primary lean burn combustion stage nearer its weak air/fuel mixture combustion extinction limit. Humidity is therefore taken as an input factor to the calculation of the equivalence ratio relationships for combustion temperature rise.

As previously mentioned, accurate knowledge of air flow to each stage is essential in order accurately to control air/fuel ratios, but the proportion of total combustion air passing through each stage is determined by the geometry of the combustor itself. Therefore, only an accurate determination of the total airflow to the combustor is actually required. The present invention enables the accurate determination of such a value.

The invention should be seen in the context of the entire fuel control system for a premixed lean burn combustor in a combustion turbine engine, the combustor having at least two stages. In this context, the invention enables the control system to be provided with an air flow evaluation module which utilises an iterative algorithm to derive an accurate value of total air flow to the combustor. The evaluation module then divides the total air flow value into the proportions required by the combustor stages, so obtaining output signals in parallel which represent the air flow to respective combustor stages. Each such output signal is then passed as an input to an associated control module responsible for setting the fuel demand signal for the appropriate combustor stage.

BRIEF DESCRIPTION OF THE DRAWINGS

Exemplary embodiments of the present invention will now be described with reference to the accompanying drawings, in which.

DETAILED DESCRIPTION OF THE DRAWINGS

Figure 1:
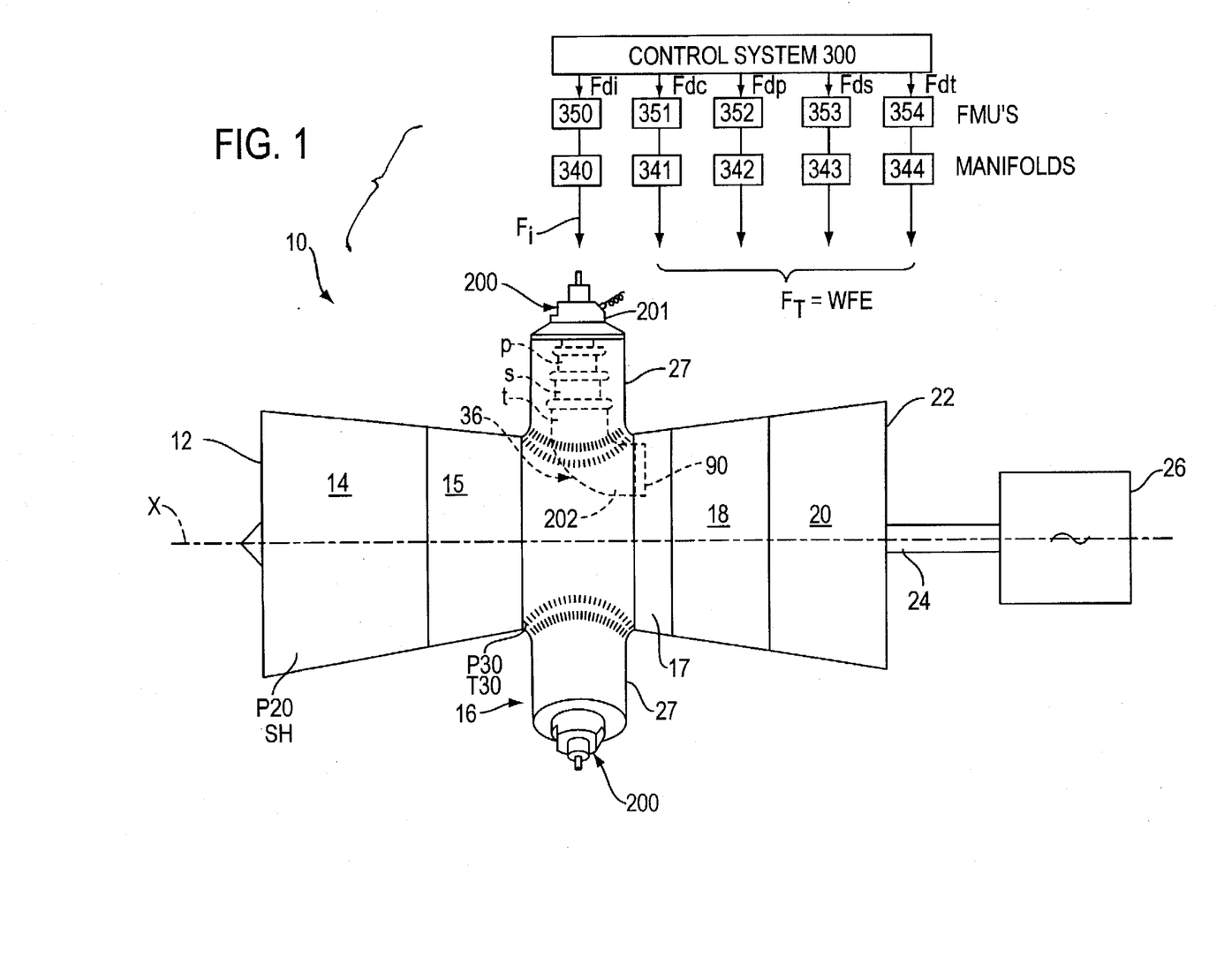
FIG. 1 diagrammatically illustrates the major mechanical sections of an industrial gas turbine engine with low emissions capability, together with a block diagram of an associated fuel control and supply system for setting fuel flow to the engine in accordance with the invention.

Looking at FIG. 1, an industrial gas turbine engine 10 comprises in axial flow series an air inlet 12, a low pressure (LP) compressor section 14, a high pressure (HP) compressor section 15, a combustor section 16, an HP turbine section 17, an LP turbine section 18, a power turbine section 20, and an exhaust gas outlet 22. The HP and LP turbine sections 17,18 drive the corresponding compressor sections 15,14 through concentric shafts (not shown) within the engine, each assembly of a turbine and a compressor joined together by a shaft being termed a "spool". The power turbine section 20 drives a load 26 by means of a shaft 24. In this instance load 26 is indicated as an electrical generator, but could alternatively be, for instance, a pumping set for an oil, water, or gas pipeline.

In order to avoid surging of the compressor under certain engine load conditions, the compressor sections 14 and/or 15 may be provided with bleed valves (not shown) for venting excess air.

The combustor 16 comprises, say, nine separate combustion chambers disposed within respective casings 27 of generally cylindrical form. Casings 27 project generally radially outwards of the rest of the engine and are equiangularly spaced around the engines's longitudinal axis X. Only two of the casings 27 are shown for simplicity of illustration, the arrangement of one of the combustion chambers 36 within its casing 27 being indicated by dashed lines. Each combustion chamber 36 has a combustor head 200 at the radially outer end of each casing 27, the heads 200 receiving fuel feeds and electrical power as described in the above mentioned prior patent applications.

Each combustion chamber 36 includes an igniter 201 in its head 200, followed in flow series by primary, secondary and tertiary combustion stages p, s and t, respectively. The tertiary stage t transitions to a discharge nozzle 202 which is turned from the radial to the downstream axial direction so that the combustion gases are discharged directly into the HP turbine 17, past nozzle guide vanes 90 to which the discharge nozzles 202 are secured.

Igniter 201 and the subsequent combustion stages receive fuel $F_i$, $F_T$, respectively. High pressure air is supplied from the outlet of the HP compressor section 15 for mixing with the fuel to achieve desired air/fuel ratios in the combustion chamber. The fuel is of known calorific value LHV, having a stoichiometric air/fuel ratio STOI and an equivalence ratio $\Phi$. It is supplied to the combustor 16 through five different sets of injectors and burns in three modes, as described below and in the above-mentioned patent applications.

Ignition Mode

All the combustion chambers 36 are ignited and maintain their combustion independently of each other, and each therefore requires its own fuel igniter unit 201. The igniter units 201 have fuel injectors (not shown) which receive fuel $F_i$ from a fuel manifold, shown diagrammatically as box 340. Units 201 also receive a small portion of the high pressure air from the exit of the HP compressor 15, for mixing and burning with the fuel within the units. The flow rate of fuel $F_i$ from the manifold to the igniter units 201 is regulated by a fuel metering unit 350 under the control of a fuel demand signal $F_{di}$ from a microprocessor-based fuel control system 300. Control system 300 sets signal $F_{di}$ to achieve satisfactory ignition and start up for the engine, but does not make adjustments specifically to achieve fuel/air ratios which minimise emission of pollutants. This is environmentally acceptable because operation of the engine in ignition mode is of short duration.

Other Modes

During operation in the primary diffusion combustion mode and the low emission mode, the combustion chambers 36 receive a total amount of fuel $F_T$ as separate fuel supplies to four other sets of fuel injectors (not shown) from four corresponding fuel manifolds, indicated diagrammatically by boxes 341–344. Fuel supplies to these manifolds are regulated by corresponding fuel metering units 351–354 under the control of respective fuel demand signals $F_{dc}$, $F_{dp}$, $F_{ds}$, $F_{dt}$ from fuel control system 300.

Signal $F_{dc}$ is set by control system 300 to achieve satisfactory combustion in the diffusion flame combustion mode within primary combustion stage p, whereas signals $F_{dp}$, $F_{ds}$, and $F_{dt}$ are set to achieve satisfactory combustion in the lean burn combustion mode within the primary, secondary and tertiary combustion stages p, s and t, respectively. With accurate knowledge of the total airflow to the combustor 16, derived as described below utilising the principles of the invention, the control system 300 can adjust signals $F_{dp}$, $F_{ds}$, and $F_{dt}$ specifically to achieve fuel/air ratios which minimise emission of pollutants, at the same time maintaining stable combustion.

Derivation of total combustion airflow

Figure 2:
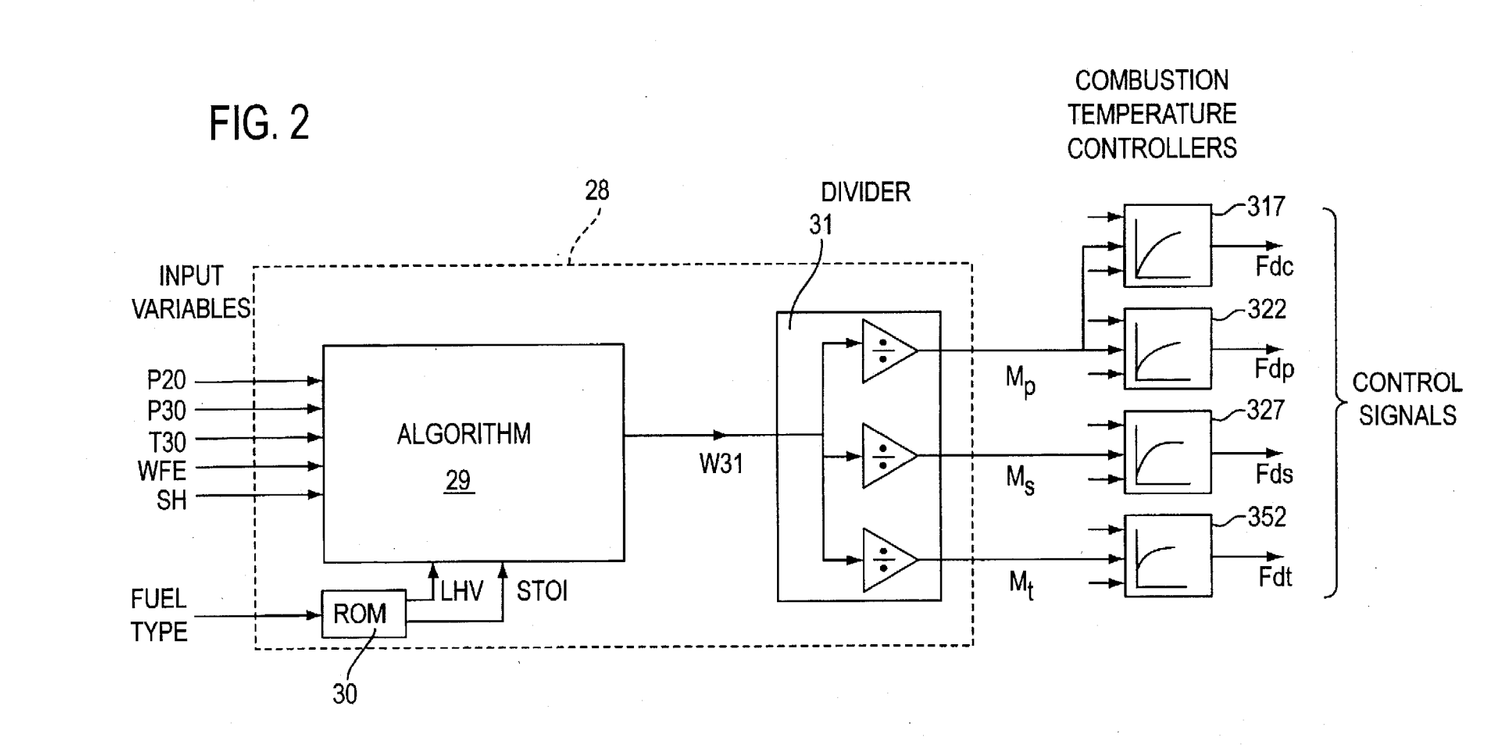
FIG. 2 is a diagrammatic representation of part of the fuel control system of FIG. 1.

Looking at FIGS. 1 and 2 together, one of the program modules running in control system 300 is an air flow evaluation module 28 which utilises an iterative algorithm routine 29 (described below with reference to FIG. 3) to derive the required accurate value for total mass flow of air W31 to the combustor 16. Variable data inputs required by the evaluation module 28 comprise values of engine inlet pressure P20, HP compressor exit pressure P30, HP compressor exit temperature T30, fuel flow rate WFE and specific humidity SH.

Also required by the evaluation module 28 is knowledge of the fuel type currently being used by the engine. A code indicative of the fuel type is input to the control systems central processing unit (CPU), which is linked to a ROM 30 which stores information on the calorific value LHV of various fuels and their stoichiometric air to fuel ratios STOI. Depending upon which fuel code is input to the CPU, ROM 30 provides a read out of the required information to the algorithm routine 29.

When algorithm routine 29 has calculated the total air flow W31 to the combustor 16, the value W31 is output to a divider 31 which divides the total air flow into the proportions, Mp, Ms, Mr, required by the primary, secondary and tertiary combustor stages respectively. These proportions are known and are fixed by the design of the combustor. These output signals are then input to associated control modules 317, 322, 327, 352 which set the fuel demand signals $F_{dc}$, $F_{dp}$, $F_{ds}$, $F_{dt}$ for the fuel metering units 351–354.

Control system 300 is implemented as a digital electronic controller which executes software embodying the necessary control functions. The code comprising the software must be executed within a predefined recursion period determined by the interrupt frequency of the CPU, the desired rate of response of the engine to control inputs, the number of input variables which must be sampled by the controller, and the time taken by the controller to execute the software code. For example, the recursion period may be 10 milliseconds.

Figure 3:
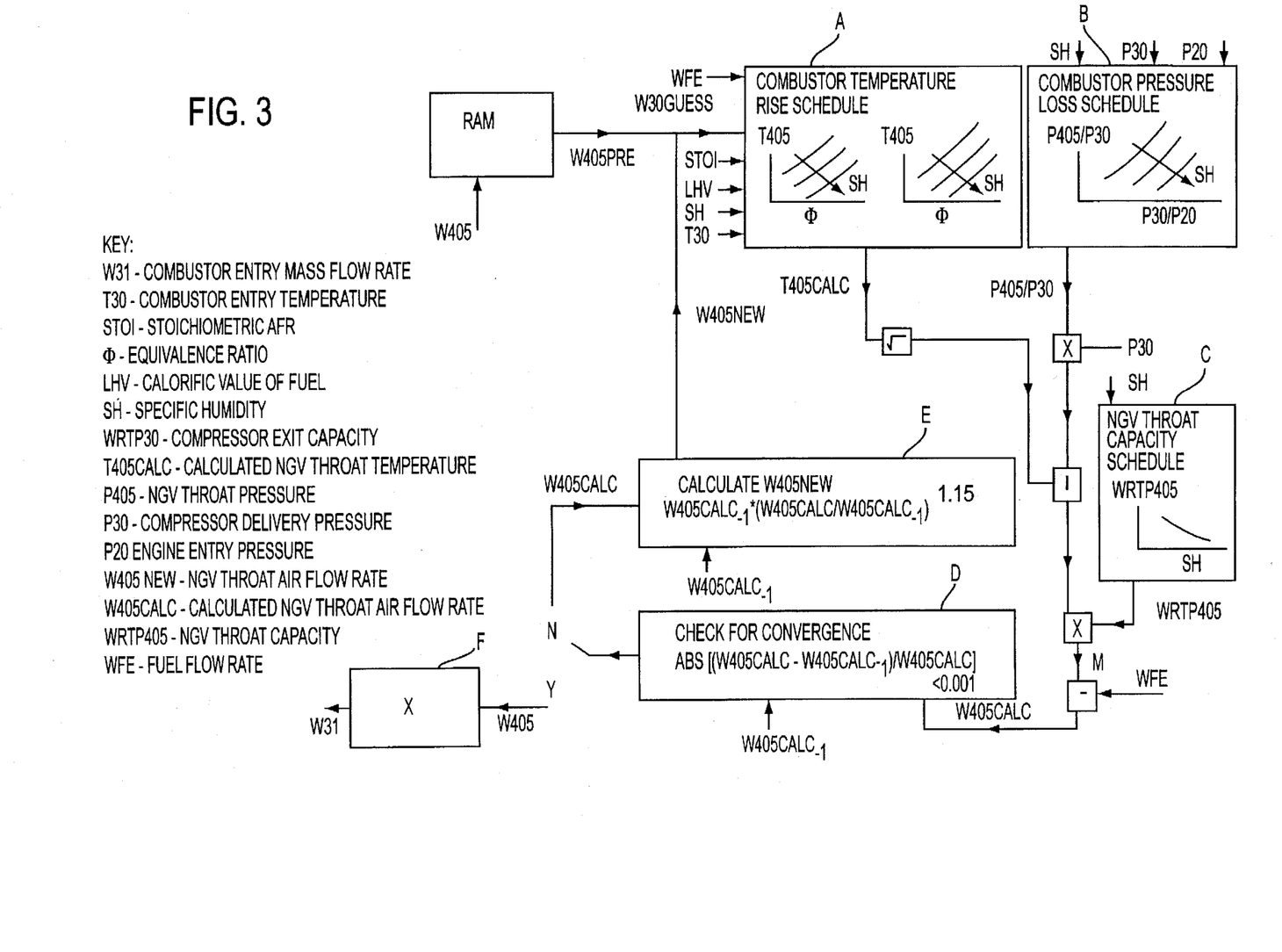
FIG. 3 is a flow diagram for an algorithm function included in FIG. 2 for evaluating the combustor entry air mass in accordance with the invention.

Referring now to FIG. 3, a block diagram of the algorithm routine 29 is shown. Variables measured as discussed with reference to FIGS. 1 and 2 are input to the algorithm routine 29. All other values required in the algorithm are calculated.

An overview of the calculations performed by the algorithm and some possible iteration modes will now be given.

The internal task of the algorithm is to calculate a true value of W405, the mass flow rate of air in the throat of the nozzle formed by the ring of NGV's 90 (FIG. 1). From this, a true value of W31 can easily be obtained.

To begin the process of calculation, a value W405PRE is input to the algorithm. This is a value of W405 previously calculated and verified by the algorithm during the previous recursion period of the controller. Variables used in the calculation, whether sampled sensor values, calculated variables, or output variables, are retained in the controller's memory until the next recursion period. Thus, at the end of each recursion period of the controller, the the current calculated value of W405, is retained in RAM as W405PRE, displacing the previously derived value of W405PRE.

At switch-on of the control system, it may be arranged that the RAM is initialised with a preset value from the software which the algorithm uses to arrive at a first verified value for W405.

Along with other variables already mentioned, W405PRE is input to the first of three schedules A, B and C whose outputs are combined to give an estimate of M, the mass flow rate of the combustion gases. The three schedules are:

A—Combustor Temperature Rise Schedule
B—Combustor Pressure Loss Schedule
C—NGV Throat Capacity Schedule.

After deduction from M of the total mass flow rate WFE (FIG. 1) of fuel to the combustor, the remainder is W405CALC, a calculated value of W405. Using a subroutine D, the algorithm then checks the value of W405CALC for convergence with the true value of W405 in accordance with a predetermined criterion, as explained later.

If the test for convergence is passed at the first iteration of the algorithm, the value W405CALC may be accepted as the true value of W405 and after factoring in subroutine F to remove the contribution of the mass flow rate of the cooling air, may be output from the algorithm as a true value of W31 for use as already explained in relation to FIG. 2.

If the test for convergence in D is not passed, or if it is desired to further refine an already acceptable value, W405CALC is input to a further subroutine E where it is subjected to a simple mathematical procedure before being reinput to Schedule A as W405NEW for a further iteration of the algorithm.

Achieving good convergence of the algorithm is important to both arriving at a valid value of W405 and arriving at it within the recursion period of the controller, the permissible number of iterations of the algorithm depending upon the computational capacity and speed of the controller. In a preferred embodiment of the invention, convergence of the algorithm on the true value of W405 occurs in a maximum of three iterations of the algorithm. This allows the controller to execute all necessary control software within its recursion period.

In FIG. 3, the output W405NEW for one iteration of the algorithm is shown as being fed back to the input of the calculation process for the next iteration. However, re-using the same block of software code is not the fastest way of executing the calculations. A faster and preferred way is to repeat the calculations using successive blocks of code which replicate the instructions for the algorithm, so that the output of the first block inputs a second block of replicated instructions, and so on.

A more detailed account of the calculations performed by the algorithm will now be given.

Combustor Temperature Rise Schedule A derives the temperature rise T405 due to combustion. The inputs to Schedule A are used to calculate T405 using well known thermodynamic relationships. In addition to W405PRE or W405NEW, the inputs comprise fuel flow rate WFE, gas fuel properties STOI and LHV, the combustor entry temperature T30, and specific humidity SH.

Schedule A is a three dimensional schedule of fuel equivalence ratio $\phi$ (Phi) against temperature rise T405. The Schedule is dependent upon the input value of specific humidity SH, in the second dimensional plane, i.e. the temperature rise reduces with increasing specific humidity. In the third dimensional plane the temperature rise schedule is dependent on an input of combustor entry temperature T30, i.e., Schedule A has an output of T405CALC=T30+T405 for any particular value of specific humidity SH.

A combustor pressure loss factor P405/P30, which is the ratio of the NGV throat pressure to the compressor delivery pressure, is calculated in parallel with T405CALC, using a schedule B of P405/P30 against the pressure ratio P30/P20 of the compressor 15, adjusted for specific humidity SH. For this purpose, Schedule B is provided with feedbacks of specific humidity SH, compressor delivery pressure P30 and engine entry pressure P20. Schedule B may be a look-up table, the pressure ratio relationship as modified by humidity values being derived from tests of the engine type.

The square root of the output of schedule A is extracted and the output of schedule B is multiplied by P30 to give the NGV throat pressure P405. The two resulting values are then ratioed to give $$\frac{\sqrt{T405CALC}}{P405}.$$

This value is then multiplied by the current flow capacity of the NGV throat, WRTP405, which is output from a Schedule C. The result of the multiplication is the NGV throat mass flow rate M.

Schedule C may be a look-up table. The NGV flow capacity for a given temperature and pressure is modified by humidity values. Consequently, Schedule C needs input SH, the specific humidity.

Next, the fuel flow rate WFE is deducted from M to give a calculated value of the NGV air mass flow rate W405CALC. At this stage during all iterations except the final one, the value W405CALC is checked to ascertain whether it is converging with the true value of W405. This is accomplished by comparing W405CALC with a value W405CALC$_{-1}$, which is the value of W405CALC derived during the previous iteration of the algorithm (for the first iteration in each recursion period, this will be the value W405PRE). The comparison is done using a subroutine D which applies a convergence criterion:

ABS [(W405CALC−W405CALC$_{-1}$)/W405CALC]<0.001

If the convergence ratio is within the allowed tolerance, W405CALC is output as the true value of W405.

Note that a certain amount of air CA is diverted from the HP compressor exit for cooling the NGV's and HP turbine, so bypassing the combustor. Therefore, to arrive at a true value W31 for the mass flow rate of air at the entry to the combustor, for use in the control system as shown in FIG. 2, the amount of cooling air CA must be deducted from W405. CA is in fact a known constant proportion of W405, so W405 can simply be multiplied by an appropriate constant factor F (=1 CA/W405) to give the output value W31 from the algorithm.

Returning to subroutine D, if the convergence ratio is greater than the allowed tolerance of 0.001, W405CALC is output to a further subroutine E which performs a calculation:

$$W405NEW=W405CALC_{-1}*(W405CALC/W405CALC_{-1})^{1.15}$$

W405NEW is then input to schedule A for a further iteration of W405CALC.

Testing has shown that the true and calculated values will converge in three passes or less, thereby efficiently using the available processor interrupt times for computation. The result is more accurate than known methods, giving better fuel control with less likelihood and flameout during engine transients. It also needs a minimum of feedback signals, thus minimising instrumentation.

We claim:

1. A method for regulating fuel flow in a gas turbine engine comprising a compressor section, a combustor section, a turbine section, turbine nozzle guide vanes, fuel inputs and means to measure values for one or more of the parameters: engine entry pressure, compressor delivery pressure, combustor entry temperature, compressor exit capacity, nozzle guide vane throat temperature, nozzle guide vane throat capacity, fuel flow rate, specific humidity of the air, wherein the method includes the evaluation of combustor entry air mass flow rate, the method for said evaluation comprising the steps of:

a) estimating a value for the nozzle guide vane throat air mass flow rate;

b) evaluating nozzle guide vane throat temperature;

c) evaluating nozzle guide vane throat pressure;

d) evaluating nozzle guide vane throat capacity;

e) using the values of nozzle guide vane throat temperature, pressure and capacity to calculate nozzle guide vane throat mass flow rate;

f) taking a value for fuel flow rate and deducting it from the nozzle guide vane throat mass flow rate to give a value for air mass flow rate;

g) comparing the calculated value of the air mass flow rate with the estimated value of the air mass flow rate and checking whether the two values agree within a specified tolerance;

h) if the two values of air mass flow rate do not agree within a specified tolerance making a revised estimate and carrying out steps b) to g) again until the two values of air mass flow rate agree within the specified tolerance;

i) when the two values of air mass flow rate agree within the specified tolerance outputting the calculated value of air mass flow rate to give an output for the combustor entry air mass flow rate where calculated value of air mass flow rate=combustor entry air mass flow rate plus any air flow diverted from the combustor entry air flow.

2. A method according to claim 1 wherein an estimate of the value of nozzle guide vane throat air mass flow rate is made by ratioing the compressor exit capacity with the combustor entry temperature and multiplying the result by the compressor delivery pressure.

3. A method according to claim 2 wherein the specific humidity of the air and the estimated value of the nozzle guide vane throat air mass flow rate are input to a combustion temperature rise schedule of the equivalence ratio $\phi$ (phi) of the fuel against nozzle guide vane throat temperature rise dependent upon the input value of the specific humidity of the air in the two dimensional plane and with an input of combustor entry temperature in the three dimensional plane giving an output of evaluated nozzle guide vane throat temperature=combustor entry temperature and nozzle guide vane throat temperature for the input specific humidity.

4. A method according to claim 3 wherein a combustion temperature rise schedule includes further inputs which comprise one or more of the stoichiometric air-fuel ratio, the calorific value of the fuel and fuel flow rate.

5. A method according to claim 1 wherein a combustor pressure loss factor is calculated using a schedule of combustor pressure loss factor against the pressure ratio of the compressor adjusted for specific humidity.

6. A method according to claim 5 wherein the output of the schedule is multiplied by the compressor delivery pressure to give the nozzle guide vane throat pressure.

7. A method according to claim 1 wherein the nozzle guide vane throat capacity adjusted for specific humidity is derived from a schedule of nozzle guide vane throat capacity against specific humidity.

8. A method according to claim 1 wherein the square root of the nozzle guide vane throat temperature is divided by the nozzle guide vane throat pressure and multiplied by the nozzle guide vane throat capacity to give the nozzle guide vane throat mass flow rate.

9. A method according to claim 1 wherein the calculated value for air mass flow rate is compared with the estimated value of the nozzle guide vane throat air mass flow rate according to a convergence criterion where the convergence criteria is:

$$ABS(W405CALC-W405E)/W405$$

$$CALC<x$$

where x is a specified value.

10. A method according to claim 9 wherein x=0.001.

11. A method according to claim 1 wherein the revised value of the nozzle guide vane throat air mass flow rate is calculated from a function where the function is:

$$W405NEW=W405E*(W405CALC/W405E)^{1.15}.$$

12. A method according to claim 1 wherein nozzle guide vane cooling air is diverted before the air flow passes into the combustor and the value of the cooling air flow is deducted from the calculated nozzle guide vane throat air mass flow rate to give an output of the combustor entry air mass flow rate.

13. A fuel control system for a gas turbine engine comprising a compressor section, a combustor section, a turbine section, turbine nozzle guide vanes, fuel inputs and means to measure values for one or more of the parameters: engine entry pressure, compressor delivery pressure, combustor entry temperature, compressor exit capacity, nozzle guide vane throat temperature, nozzle guide vane throat capacity, fuel flow rate, specific humidity of the air, wherein the fuel control system includes means to evaluate the combustor entry air mass flow rate, the means for said evaluation comprising:

a) means to estimate a value for the nozzle guide vane throat air mass flow rate;

b) means to evaluate nozzle guide vane throat temperature;

c) means to evaluate nozzle guide vane throat pressure;

d) means to evaluate nozzle guide vane throat capacity;

e) means using the values of nozzle guide vane throat temperature, pressure and capacity to calculate nozzle guide vane throat mass flow rate;

f) means to take a value for fuel flow rate and deduct it from the nozzle guide vane throat mass flow rate to give a value for air mass flow rate;

g) means to compare the calculated value of the air mass flow rate with the estimated value and to check whether the two values of the air mass flow rate agree within a specified tolerance;

h) means to make a revised estimate if the two values of the air mass flow rate do not agree within a specified tolerance;

i) means to give an output for the combustor entry air mass flow rate where calculated value of air mass flow rate=combustor entry air mass flow rate plus any air flow diverted from the combustor entry air flow when the two values of air mass flow rate agree within the specified tolerance outputting the calculated value of air mass flow rate.

14. A fuel control system according to claim 13 wherein the means to estimate the value of nozzle guide vane throat air mass flow rate has means to make a ratio between the compressor exit capacity and the combustor entry temperature and means to multiply the result by the compressor delivery pressure.

15. A fuel control system according to claim 13 wherein the specific humidity of the air and the estimated value of the nozzle guide vane throat air mass flow rate are input to a combustion temperature rise schedule of the equivalence ratio $\phi$ (phi) of the fuel against nozzle guide vane throat temperature rise dependent upon the input value of the specific humidity of the air in the two dimensional plane and with an input of combustor entry temperature in the three dimensional plane giving an output of evaluated nozzle guide vane throat temperature=combustor entry temperature plus nozzle guide vane throat temperature for the input specific humidity.

16. A fuel control system according to claim 15 wherein a combustion temperature rise schedule includes further inputs which comprise one or more of the stoichiometric air-fuel ratio, the calorific value of the fuel and fuel flow rate.

17. A fuel control system according to claim 13 wherein there are means to calculate a combustor pressure loss factor using a schedule of combustor pressure loss factor against the pressure ratio of the compressor adjusted for specific humidity.

18. A fuel control system according to claim 17 wherein there are means to multiply the output of the schedule by the compressor delivery pressure to give the nozzle guide vane throat pressure.

19. A fuel control system according to claim 13 wherein there are means to adjust the nozzle guide vane throat capacity for specific humidity derived from a schedule of nozzle guide vane throat capacity against specific humidity.

20. A fuel control system according to claim 13 wherein there are means to divide the square root of the nozzle guide vane throat temperature by the nozzle guide vane throat pressure and means to multiply by the nozzle guide vane throat capacity to give the nozzle guide vane throat mass flow rate.

21. A fuel control system according to claims 13 wherein there are means to compare the calculated value for air mass flow rate with the estimated value of the nozzle guide vane throat air mass flow rate according to a convergence criterion where the convergence criterion is:

$$ABS(W405CALC-W405E)/W405CALC<x$$

where x is a specified value.

22. A fuel control system according to claim 21 wherein x=0.001.

23. A fuel control system according to claim 13 wherein the revised value of the estimated value of the nozzle guide vane throat air mass flow rate is calculated from function where the function is:

$$W405NEW=W405E*(W405CALC/W405E)^{1.15}.$$

24. A fuel control system according to claims 13 wherein the nozzle guide vane cooling air is diverted before the air flow passes into the combustor and there are means to deduct the value of the cooling air flow from the calculated nozzle guide vane throat air mass flow rate to give an output of the combustor entry air mass flow rate.

* * * * *